US012017661B2

(12) United States Patent
Kim et al.

(10) Patent No.: US 12,017,661 B2
(45) Date of Patent: Jun. 25, 2024

(54) SYSTEM AND METHOD IN VEHICLE PATH PREDICTION BASED ON FULL NONLINEAR KINEMATICS (71) Applicant: Canoo Technologies Inc., Torrance, CA (US)

(72) Inventors: Kilsoo Kim, Hermosa Beach, CA (US); Jongmoo Choi, Gardena, CA (US); Mayukh Sattiraju, Redondo Beach, CA (US); Siddharth Agarwal, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 171 days.

(21) Appl. No.: 17/305,704

(22) Filed: Jul. 13, 2021

(65) Prior Publication Data
US 2023/0018786 A1  Jan. 19, 2023

(51) Int. Cl.
*B60W 40/105* (2012.01)
*B60K 1/00* (2006.01)
(Continued)

(52) U.S. Cl.
CPC ............ *B60W 40/105* (2013.01); *B60K 1/00* (2013.01); *B60L 15/20* (2013.01); *B60W 10/18* (2013.01);
(Continued)

(58) Field of Classification Search
CPC .... B60W 10/18; B60W 40/105; B60W 10/20; B60W 2520/10; B60W 2520/12;
(Continued)

(56) References Cited

U.S. PATENT DOCUMENTS 6,675,094 B2 * 1/2004 Russell ................. G01S 13/931
701/301
9,352,778 B2  5/2016 Yoon et al.
(Continued)

FOREIGN PATENT DOCUMENTS

CN  109740469 A  5/2019
CN  111344646 A  6/2020
(Continued)

OTHER PUBLICATIONS

Non-final Office Action dated Sep. 29, 2022, in connection with U.S. Appl. No. 17/305,702, 13 pages.
(Continued)

*Primary Examiner* — Khoi H Tran
*Assistant Examiner* — Nhi Q Bui (57) ABSTRACT

An apparatus includes at least one camera configured to capture an image of a traffic lane in front of a vehicle. The apparatus also includes a radar transceiver configured to detect one or more target vehicles proximate to the vehicle. The apparatus further includes a path prediction and vehicle detection controller configured to determine first parameters for predicting a path of the vehicle; determine second parameters for predicting the path of the vehicle; predict the path of the vehicle using a combination of the first parameters and the second parameters, where the combination is weighted based on a speed of the vehicle; identify one of the one or more target vehicles as a closest in path vehicle based on the predicted path of the vehicle; and activate at least one of a braking control and a steering control based on a proximity of the identified closest in path vehicle.

20 Claims, 8 Drawing Sheets (51) Int. Cl.
*B60L 15/20* (2006.01)
*B60W 10/18* (2012.01)
*B60W 10/20* (2006.01)
*B60R 16/023* (2006.01)

(52) U.S. Cl.
CPC ......... *B60W 10/20* (2013.01); *B60R 16/0231* (2013.01); *B60W 2520/10* (2013.01); *B60W 2520/12* (2013.01); *B60W 2710/18* (2013.01); *B60W 2710/20* (2013.01)

(58) Field of Classification Search
CPC ........... B60W 2710/18; B60W 2710/20; B60L 3/0015; B60L 15/2009; B60L 15/20; B60L 2260/32; B60L 2240/12; B60K 1/00; B60R 16/0231
See application file for complete search history.

(56) References Cited

U.S. PATENT DOCUMENTS

| | | | |
|---|---|---|---|
| 9,595,197 B2 | 3/2017 | Lee | |
| 10,227,039 B1 | 3/2019 | Prasad | |
| 11,104,336 B2* | 8/2021 | Lin | G08G 1/161 |
| 11,237,562 B2* | 2/2022 | Schultz | G05D 1/0214 |
| 11,260,757 B2* | 3/2022 | Degand | B60L 15/209 |
| 11,328,593 B2* | 5/2022 | Urano | G08G 1/165 |
| 11,535,274 B2* | 12/2022 | Dingli | G08G 1/166 |
| 2003/0229438 A1 | 12/2003 | Hac | |
| 2004/0164851 A1 | 8/2004 | Crawshaw | |
| 2008/0071451 A1 | 3/2008 | Yamaguchi et al. | |
| 2009/0021358 A1 | 1/2009 | Lee et al. | |
| 2009/0030613 A1 | 1/2009 | Kataoka et al. | |
| 2009/0037062 A1 | 2/2009 | Lee et al. | |
| 2009/0157263 A1 | 6/2009 | Shin | |
| 2009/0284360 A1 | 11/2009 | Litkouhi | |
| 2010/0172542 A1 | 7/2010 | Stein et al. | |
| 2010/0182139 A1 | 7/2010 | Chen et al. | |
| 2012/0022739 A1 | 1/2012 | Zeng | |
| 2012/0050074 A1 | 3/2012 | Bechtel et al. | |
| 2013/0190982 A1 | 7/2013 | Nakano et al. | |
| 2013/0190985 A1 | 7/2013 | Nakano et al. | |
| 2013/0261898 A1 | 10/2013 | Fujita et al. | |
| 2013/0321172 A1 | 12/2013 | Igarashi et al. | |
| 2013/0335213 A1 | 12/2013 | Sherony et al. | |
| 2013/0345900 A1 | 12/2013 | Usui | |
| 2014/0002655 A1 | 1/2014 | Woo et al. | |
| 2014/0236428 A1 | 8/2014 | Akiyama | |
| 2015/0149037 A1 | 5/2015 | Lim et al. | |
| 2015/0314783 A1 | 11/2015 | Nespolo et al. | |
| 2017/0010618 A1 | 1/2017 | Shashua et al. | |
| 2017/0313253 A1 | 11/2017 | Hughes et al. | |
| 2018/0024238 A1 | 1/2018 | Khlifi | |
| 2018/0024562 A1 | 1/2018 | Bellaiche | |
| 2018/0025235 A1 | 1/2018 | Fridman | |
| 2018/0141528 A1 | 5/2018 | Oh et al. | |
| 2018/0150700 A1 | 5/2018 | Kaneko et al. | |
| 2018/0186378 A1 | 7/2018 | Zhuang et al. | |
| 2018/0237007 A1 | 8/2018 | Adam et al. | |
| 2018/0307236 A1 | 10/2018 | Reed | |
| 2019/0072973 A1 | 3/2019 | Sun et al. | |
| 2019/0202453 A1 | 7/2019 | Farooqi et al. | |
| 2019/0283748 A1 | 9/2019 | Hajika et al. | |
| 2019/0384294 A1 | 12/2019 | Shashua et al. | |
| 2019/0389470 A1 | 12/2019 | Zarringhalam et al. | |
| 2020/0079372 A1 | 3/2020 | Hajika | |
| 2020/0097016 A1* | 3/2020 | Zhu | G05D 1/0088 |
| 2020/0272835 A1 | 8/2020 | Cheng et al. | |
| 2020/0339079 A1 | 10/2020 | Ohmura | |
| 2020/0377088 A1 | 12/2020 | Fukushige et al. | |
| 2020/0379461 A1 | 12/2020 | Singh et al. | |
| 2021/0171042 A1 | 6/2021 | Hayakawa et al. | |
| 2021/0197858 A1 | 7/2021 | Zhang et al. | |
| 2021/0221364 A1 | 7/2021 | Mase et al. | |
| 2021/0229708 A1 | 7/2021 | Kondo et al. | |
| 2021/0366144 A1 | 11/2021 | Magistri et al. | |
| 2022/0082403 A1 | 3/2022 | Shapira et al. | |
| 2022/0089219 A1 | 3/2022 | Takebayashi et al. | |
| 2022/0097697 A1 | 3/2022 | Wang et al. | |
| 2022/0212670 A1 | 7/2022 | Aoki et al. | |
| 2022/0266852 A1 | 8/2022 | Khayyer | |
| 2022/0363250 A1 | 11/2022 | Varunjikar et al. | |

FOREIGN PATENT DOCUMENTS

| | | |
|---|---|---|
| CN | 109740469 B | 1/2021 |
| DE | 10333670 B4 | 7/2019 |
| EP | 3342666 A1 | 7/2018 |
| EP | 3805073 A1 | 4/2021 |
| GB | 2550256 A | 11/2017 |
| IN | 202014005110 A | 8/2020 |
| JP | 2009-020854 A | 1/2009 |
| JP | 5187171 B2 | 4/2013 |
| JP | 2018-203173 A | 12/2018 |
| JP | 2021-503414 A | 2/2021 |
| WO | 2019099622 A1 | 5/2019 |

OTHER PUBLICATIONS

International Search Report and Written Opinion of the International Search Authority dated Sep. 30, 2022, in connection with International Application No. PCT/US2022/037008, 7 pages.

International Search Report and Written Opinion of the International Search Authority dated Nov. 16, 2022, in connection with International Application No. PCT/US2022/037000, 8 pages.

International Search Report and Written Opinion of the International Search Authority dated Nov. 15, 2022, in connection with International Application No. PCT/US2022/037011, 8 pages.

International Search Report and Written Opinion of the International Search Authority dated Nov. 18, 2022, in connection with International Application No. PCT/US2022/037013, 9 pages.

International Search Report and Written Opinion of the International Search Authority dated Nov. 18, 2022, in connection with International Application No. PCT/US2022/037015, 8 pages.

International Search Report and Written Opinion of the International Search Authority dated Nov. 15, 2022, in connection with International Application No. PCT/US2022/037016, 9 pages.

Baek, et al., "Practical Approach for Developing Lateral Motion Control of Autonomous Lane Change System," Applied Sciences 2020, 10, 3143, Apr. 2020, 15 pages.

Lian et al. "Cornering Stiffness and Sideslip Angle Estimation Based on Simplified Lateral Dynamic Models for Four-in-Wheel-Motor-Driven Electric Vehicles with Lateral Tire Force Information," International Journal of Automotive Technology, vol. 16, No. 4, 2015, 15 pages.

Pereira, et al., "Cornering stiffness estimation using Levenberg-Marquardt approach," Inverse Problems in Science and Engineering, vol. 29, 2021—Issue 12, May 2021, 55 pages.

Sierra et al., "Cornering stiffness estimation based on vehicle later dynamics," Vehicle System Dynamics, vol. 44, Supplement, 2006, 15 pages.

Weon, et al., "Lane Departure Detecting with Classification of Roadway Based on Bezier Curve Fitting Using DGPS/GIS," Technical Gazette 28 1(2021), Feb. 2021, 8 pages.

Final Office Action dated Feb. 23, 2023, in connection with U.S. Appl. No. 17/305,702, 10 pages.

Bouhoute, Afaf, et al., "On the Application of Machine Learning for Cut-in Maneuver Recognition in Platooning Scenarios", 2020 IEEE 91st Vehicular Technology Conference (VTC2020-Spring), 2020, 5 pages.

Heinemann, Tonja, "Predicting Cut-Ins in Traffic Using a Neural Network", Masters thesis in Systems, Control and Mechatronics, Chalmers University of Technology, Department of Electrical Engineering, Gothenburg, Sweden, 2017, 62 pages.

Bar Hillel, Aharon, et al., "Recent Progress in Road and Lane Detection: a Survery", Machine Vision and Applications, Apr. 2014, 20 pages.

(56) References Cited

OTHER PUBLICATIONS

Morris, Brendan, et al., "Lane Change Intent Prediction for Driver Assistance: On-Road Design and Evaluation", 2011 IEEE Intelligent Vehicles Symposium (IV), Baden-Baden, Germany, Jun. 5-9, 2011, 8 pages.
Narote, S.P., et al., "A Review of Recent Advances in Lane Detection and Departure Warning System", Pattern Recognition, vol. 73, Jan. 2018, 50 pages.
Non-final Office Action dated Jan. 18, 2023, in connection with U.S. Appl. No. 17/305,701, 9 pages.
Non-final Office Action dated Mar. 30, 2023, in connection with U.S. Appl. No. 17/305,706, 12 pages.
Non-final Office Action dated Apr. 25, 2023, in connection with U.S. Appl. No. 17/305,703, 17 pages.
Notice of Allowance dated Aug. 7, 2023, in connection with U.S. Appl. No. 17/305,706, 6 pages.
Notice of Allowance dated Aug. 3, 2023, in connection with U.S. Appl. No. 17/305,702, 8 pages.
Final Office Action dated Jun. 23, 2023, in connection with U.S. Appl. No. 17/305,701, 13 pages.
Notice of Allowance dated Jun. 29, 2023, in connection with U.S. Appl. No. 17/305,702, 9 pages.
Non-final Office Action dated Jun. 30, 2023, in connection with U.S. Appl. No. 17/305,705, 12 pages.
Notice of Allowance dated Oct. 18, 2023, in connection with U.S. Appl. No. 17/305,703, 11 pages.
Notice of Allowance dated Oct. 18, 2023, in connection with U.S. Appl. No. 17/305,705, 11 pages.
Non-final Office Action dated Aug. 24, 2023, in connection with U.S. Appl. No. 17/305,701, 12 pages.

* cited by examiner

SYSTEM AND METHOD IN VEHICLE PATH PREDICTION BASED ON FULL NONLINEAR KINEMATICS

CROSS-REFERENCE TO RELATED APPLICATIONS

This application is related to the subject matter of: U.S. patent application Ser. No. 17/305,701, filed Jul. 13, 2021 and entitled SYSTEM AND METHOD IN THE PREDICTION OF TARGET VEHICLE BEHAVIOR BASED ON IMAGE FRAME AND NORMALIZATION; U.S. patent application Ser. No. 17/305,702, filed Jul. 13, 2021 and entitled SYSTEM AND METHOD IN DATA-DRIVEN VEHICLE DYNAMIC MODELING FOR PATH-PLANNING AND CONTROL; U.S. patent application Ser. No. 17/305,703, filed Jul. 13, 2021 and entitled SYSTEM AND METHODS OF INTEGRATING VEHICLE KINEMATICS AND DYNAMICS FOR LATERAL CONTROL FEATURE AT AUTONOMOUS DRIVING; U.S. patent application Ser. No. 17/305,705, filed Jul. 13, 2021 and entitled SYSTEM AND METHOD IN LANE DEPARTURE WARNING WITH FULL NONLINEAR KINEMATICS AND CURVATURE; U.S. patent application Ser. No. 17/305,706, filed Jul. 13, 2021 and entitled SYSTEM AND METHOD FOR LANE DEPARTURE WARNING WITH EGO MOTION AND VISION. The content of the above-identified patent documents is incorporated herein by reference.

TECHNICAL FIELD

This disclosure relates generally to vehicle driver assist or autonomous driving systems. More specifically, this disclosure relates to vehicle path prediction and closest in path vehicle detection.

BACKGROUND

Advanced driving assist system (ADAS) features, which use automated technology to assist the vehicle operator in driving and parking, form a foundation for autonomous driving (AD). Determination of vehicle position information and/or detection of nearby objects enables features such as: collision detection and avoidance for adaptive cruise control (ACC), emergency braking; blind spot detection for collision warning and/or evasive steering; lane detection for lane keeping and/or centering, lane changing, or lane departure warning; and path planning and control. Other ADAS and AD features may also be implemented using the same sensor set(s).

Electric vehicles (EVs) are often capable of higher driving and handling performance relative to conventional vehicles. EV designs can include low centers of gravity, independent steering, and immediate, quick, and smooth acceleration. As a result, ADAS and AD features for EVs can involve different considerations than those for conventional vehicles.

SUMMARY

Vehicle path prediction and closest in path vehicle detection for collision avoidance, within the vehicle's ADAS or AD features, is improved in ways suitable to EVs having higher driving and handling performance. Predicted path curvature is calculated based on assumption of both low vehicle speed and high vehicle speed, and the two path curvatures and corresponding derived rates of curvature are combined in a weighted manner based on the vehicle's current speed. The weighted combinations of predicted path curvature and rate more accurately predict the vehicle's path, improving identification of the closest in path vehicle for evaluation of collision potential. Steering and/or braking actuator(s) may be activated, if necessary, to avoid collision with the identified closest in path vehicle.

In one embodiment, an apparatus includes at least one camera configured to capture an image of a traffic lane in front of a vehicle. The apparatus also includes a radar transceiver configured to detect one or more target vehicles proximate to the vehicle. The apparatus further includes a path prediction and vehicle detection controller configured to determine first parameters for predicting a path of the vehicle; determine second parameters for predicting the path of the vehicle; predict the path of the vehicle using a combination of the first parameters and the second parameters, where the combination is weighted based on a speed of the vehicle; identify one of the one or more target vehicles as a closest in path vehicle based on the predicted path of the vehicle; and activate at least one of a braking control and a steering control based on a proximity of the identified closest in path vehicle.

The first parameters may include a first path curvature for predicting the path of the vehicle and a first rate of the first path curvature, and the second parameters may include a second path curvature for predicting the path of the vehicle and a second rate of the second path curvature. The first and second parameters may be accurate for different ranges of speed. The weighted combination may weight the first parameters using a weight $\alpha$ and may weight the second parameters using a weight $1-\alpha$. The weight $\alpha$ may applied to the first parameters for vehicle speeds below a first threshold, and the weight $1-\alpha$ may be applied to the second parameters for vehicle speeds above a second threshold. The weight $\alpha$ and the weight $1-\alpha$ may vary linearly with vehicle speed between the first and second thresholds. The first parameters may include a first path curvature $\kappa_L$ and a first rate $\kappa'_L$, the second parameters may include a second path curvature $\kappa_H$ and a second rate $\kappa'_H$, the first path curvature $\kappa_L$ and the second path curvature $\kappa_H$ may be combined according to $\kappa = \alpha \cdot \kappa_L + (1-\alpha) \cdot \kappa_H$, and the first rate $\kappa'_L$ and the second rate $\kappa'_H$ may be combined according to $\kappa' = \alpha \cdot \kappa'_L + (1-\alpha) \cdot \kappa'_H$. The path prediction and vehicle detection controller may be configured to generate at least one of a braking command and a steering command based on the speed of the vehicle and a proximity of the identified closest in path vehicle.

In another embodiment, a vehicle includes the apparatus and a motor configured to drive wheels of the vehicle. The vehicle also includes a chassis supporting axles on which the wheels are mounted. The steering control may be configured to generate a steering command configured to control the wheels when the steering control is activated based on the proximity of the identified closest in path vehicle. A brake actuator is configured to actuate brakes for one or more of the wheels, and the brake actuator may be configured to receive a braking control signal from the braking control when the braking control is activated based on the proximity of the identified closest in path vehicle. The vehicle may be an electric vehicle.

In still another embodiment, a method includes capturing an image of a traffic lane in front of a vehicle using at least one camera; detecting one or more target vehicles proximate to the vehicle using a radar transceiver; determining first parameters for predicting a path of the vehicle; determining second parameters for predicting the path of the vehicle;

predicting the path of the vehicle using a combination of the first parameters and the second parameters, where the combination is weighted based on a speed of the vehicle; identifying one of the one or more target vehicles as a closest in path vehicle based on the predicted path of the vehicle; and activating at least one of a braking control and a steering control based on a proximity of the identified closest in path vehicle.

The first parameters may include a first path curvature for predicting the path of the vehicle and a first rate of the first path curvature, and the second parameters may include a second path curvature for predicting the path of the vehicle and a second rate of the second path curvature. The first and second parameters may be accurate for different ranges of speed. The weighted combination may weight the first parameters using a weight $\alpha$ and may weight the second parameters using a weight $1-\alpha$. The weight $\alpha$ may applied to the first parameters for vehicle speeds below a first threshold, and the weight $1-\alpha$ may be applied to the second parameters for vehicle speeds above a second threshold. The weight $\alpha$ and the weight $1-\alpha$ may vary linearly with vehicle speed between the first and second thresholds. The first parameters may include a first path curvature $\kappa_L$ and a first rate $\kappa'_L$, the second parameters may include a second path curvature $\kappa_H$ and a second rate $\kappa'_H$, the first path curvature $\kappa_L$ and the second path curvature $\kappa_H$ may be combined according to $\kappa = \alpha \cdot \kappa_L + (1-\alpha) \cdot \kappa_H$, and the first rate $\kappa'_L$ and the second rate $\kappa'_H$ may be combined according to $\kappa' = \alpha \cdot \kappa'_L + (1-\alpha) \cdot \kappa'_H$. At least one of a braking command and a steering command may be generated based on the speed of the vehicle and a proximity of the identified closest in path vehicle.

The method may further include driving wheels of the vehicle with a motor; generating a steering command controlling the wheels when the steering control is activated based on the proximity of the identified closest in path vehicle; and actuating brakes for one or more of the wheels when the braking control is activated based on the proximity of the identified closest in path vehicle. The vehicle may be an electric vehicle.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 6, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Vehicle path prediction, planning, and/or control within ADAS or AD features often needs to account for the closest in path vehicle (CIPV). However, due to the characteristics of radar reflections off surrounding stationary or moving objects, detecting and tracking the object of main interest to a vehicle using ADAS or AD is difficult. Selecting the object detected by radar that is "closest" to the vehicle using ADAS or AD often needs to account for relevant information relating to the detected target vehicle(s), such as relative distance and velocity, as well as predicted path of the vehicle.

With kinematics, the curvature of the vehicle's predicted path (e.g., occupied traffic lane) can be obtained, together with the vehicle's lateral acceleration and speed. For example, lateral vehicle acceleration $A_y$ (in units of meters per second squared, [m/s$^2$]), path curvature $\kappa$ (in units of [m$^{-1}$]), and vehicle speed $V_x$ (in units of [m/s]) are related as:

$$A_y = \kappa \cdot V_x,$$
$$\kappa = \frac{A_y}{V_x}.$$

However, the information needs to be filtered for noisy lateral acceleration and does not consider the vehicle's dynamic effects.

Ackerman steer angle calculates path curvature from the road wheel angle $\delta_{rwa}$ (in units of radians [rad]) and the wheelbase length L (in units of [m]) as follows:

$$\tan(\delta_{rwa}) = \kappa \cdot L,$$
$$\kappa = \frac{\tan(\delta_{rwa})}{L}.$$

However, the relationship is not considered accurate for low-speed maneuvers.

Figure 1:
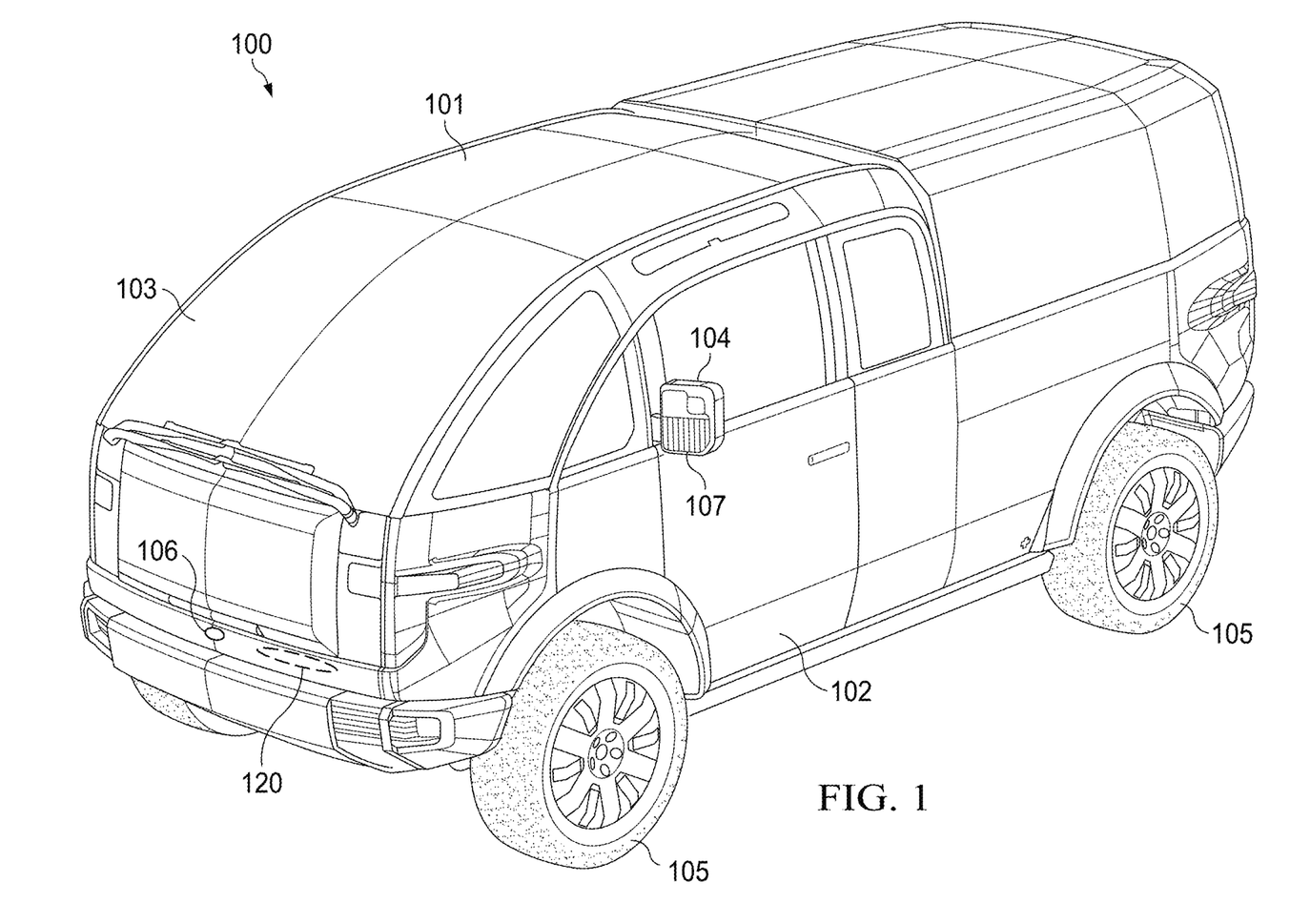
FIG. 1 is a perspective view of a vehicle within which improved vehicle path prediction and closest in path vehicle detection are implemented in accordance with embodiments of the present disclosure.

FIG. 1 is a perspective view of a vehicle 100 within which improved vehicle path prediction and closest in path vehicle detection are implemented in accordance with embodiments of the present disclosure. The embodiment of the vehicle 100 illustrated in FIG. 1 is for illustration and explanation only. FIG. 1 does not limit the scope of this disclosure to any particular implementation of a vehicle.

The vehicle 100 of FIG. 1 includes a chassis (not visible in FIG. 1) supporting a cabin 101 for carrying passengers. In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle described in further detail below. In other embodiments, the vehicle 100 is a combustion engine vehicle.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an AD mode) to see outside the cabin 101. Rear view mirrors 104 mounted to sides of the cabin 101 enable the operator to see objects to the sides and rear of the cabin 101 and may include warning indicators (e.g., selectively illuminated warning lights) for ADAS features such as blind spot warning (indicating that another vehicle is in the operator's blind spot) and/or lane departure warning.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

In the present disclosure, the vehicle 100 includes a vision system including at least a front camera 106, side cameras 107 (mounted on the bottoms of the rear view mirrors 104 in the example depicted), and a rear camera. The cameras 106, 107 provide images to the vehicle control system for use as part of ADAS and AD features as described below, and the images may optionally be displayed to the operator. In addition, the vehicle 100 includes a radar transceiver 120 (shown in phantom in FIG. 1, as not visible from the exterior of vehicle 100).

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1, and the improved vehicle path prediction and closest in path vehicle detection described in this disclosure may be used with any other suitable vehicle.

Figure 2:
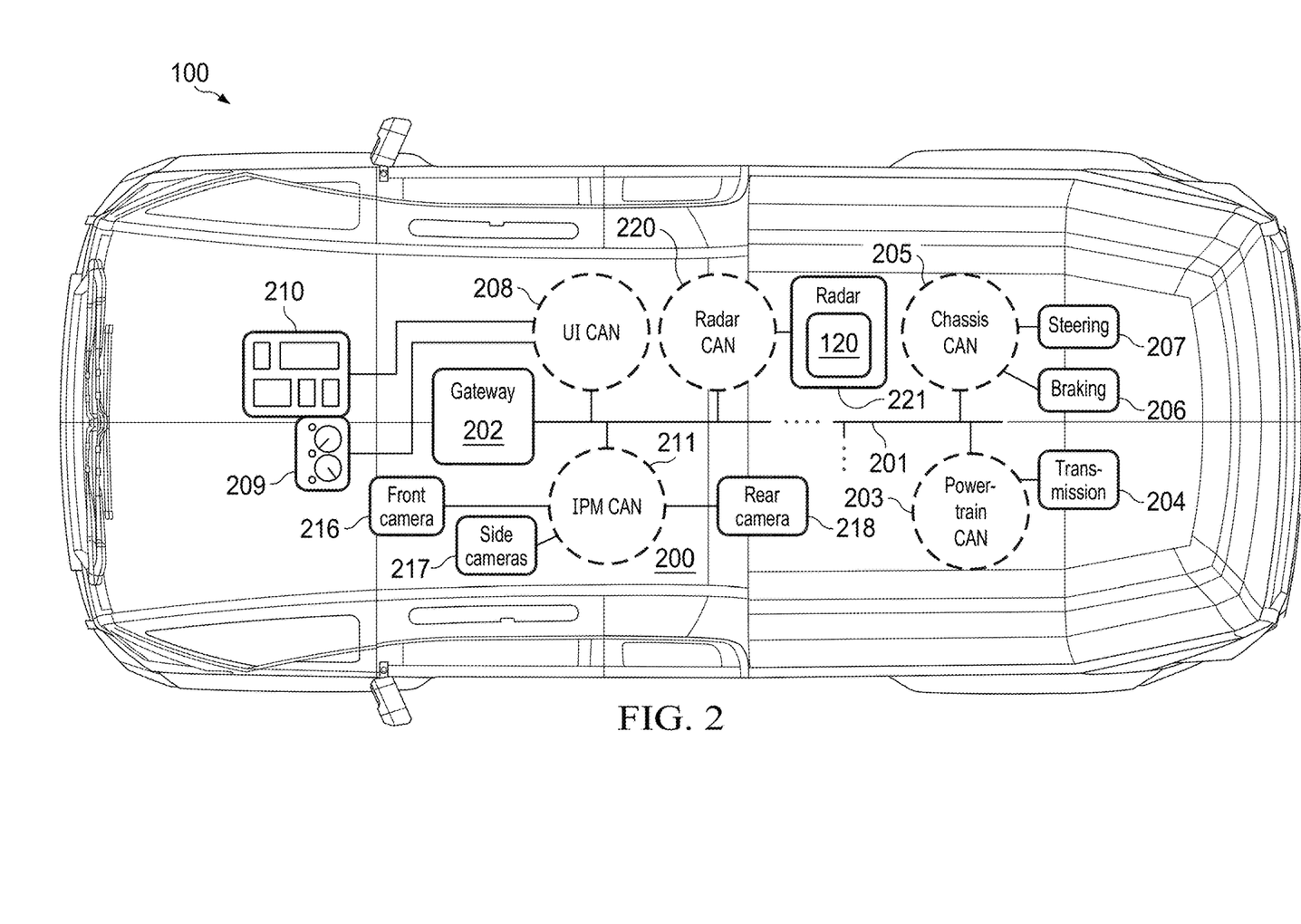
FIGS. 2 and 2A depict a vehicle control system for a vehicle within which improved vehicle path prediction and closest in path vehicle detection are implemented in accordance with embodiments of the present disclosure.
Figure 2A:
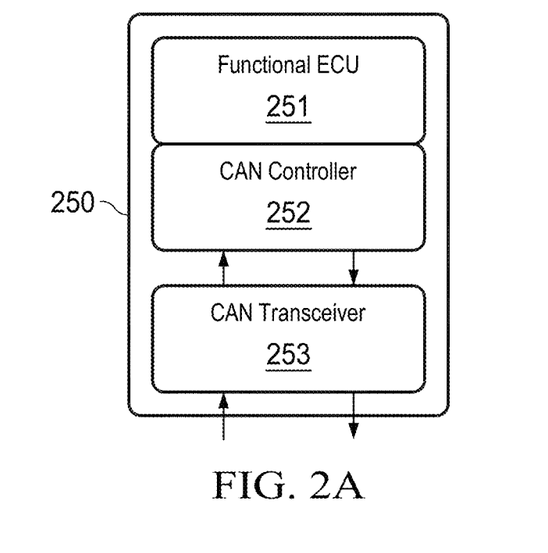

FIGS. 2 and 2A depict a vehicle control system 200 for a vehicle within which improved vehicle path prediction and closest in path vehicle detection are implemented in accordance with embodiments of the present disclosure. The embodiment of the vehicle control system 200 illustrated in FIGS. 2 and 2A is for illustration and explanation only. FIGS. 2 and 2A do not limit the scope of this disclosure to any particular implementation of a vehicle control system.

FIG. 2 depicts a modern vehicle control system 200 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 2). Sensors constantly report whether doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 2, the vehicle control system 200 includes a CAN bus 201 embodied or controlled by a gateway ECU 202, which facilitates messages on and among CANs, transmitted and detected by ECUs. FIG. 2 illustrates a powertrain CAN 203 to which a transmission ECU 204 is connected and a chassis CAN 205 to which a braking ECU 206 and a steering (e.g., steering angle) ECU 207 are connected. The braking ECU 206 is connected to brake actuator(s) (not shown) for emergency and normal braking, while the steering ECU 207 is connected to a steering drive motor for evasive and normal steering. The vehicle control system 200 in FIG. 2 also includes a user interface (UI) CAN 208 to which a "dashboard" ECU 209 and a touchscreen ECU 210 are connected. The ECUs 209 and 201 may be integrated with the respective dashboard controls and touchscreen. The UI CAN 208 and the associated dashboard ECU 209 and touchscreen 210 allow the operator to set operating parameters such as following distance for ACC, enable or disable ADAS indicators such as blind spot detection or collision warning, and the like. The dashboard ECU 209 may be connected to sensors and indicators other than those on the dashboard, such as the rear view mirror blind spot indicators described above. The ADAS indicators may include illuminated indicators on any combination of the dashboard and the rear view mirrors and/or in a heads-up display projected onto the windshield 103; audio warnings sounded on the vehicle's audio system speakers; and/or haptic indicators such as a vibrator within the vehicle operator's seat.

For the present disclosure, the vehicle control system 200 includes an image processing module (IPM) CAN 211 to which the front camera ECU 216, side camera ECU 217, and rear camera ECU 218 are connected. The front camera ECU 216 receives image data from the front camera 106 on the vehicle 100, while the side camera ECU 217 receives image data from each of the side cameras 107, and the rear camera ECU 218 receives image data from the rear camera. In some embodiments, a separate ECU may be used for each camera, such that two side camera ECUs may be employed. The IPM CAN 211 and the front camera ECU 216, side camera ECU 217, and rear camera ECU 218 process image data for use in vision-based ADAS features, such as providing a rear back-up camera display and/or stitching together the images to create a "bird's eye" view of the vehicle's surroundings.

For the present disclosure, the vehicle control system 200 also includes a radar CAN 220 to which a radar ECU 221 and a radar transceiver are connected. The radar CAN 220, radar ECU 221, and radar transceiver are used to detect objects around the vehicle 100 and to measure the relative distance to and velocity of those objects.

FIG. 2A illustrates a high level block diagram for the architecture 250 of each CAN depicted in FIG. 2. Each CAN shown in FIG. 2, including the chassis CAN 205, IPM CAN 211, and radar CAN 220, includes a functional ECU 251 for the specific function performed by the respective CAN (e.g., at least steering and braking in the case of the chassis CAN 205, image processing in the case of the IPM CAN 211, and radar detection of surrounding objects in the case of the radar CAN 220). The functional ECU 251 is coupled to a CAN controller 252 that controls the interactions of the respective CAN with the other CANs within the vehicle 100 through the gateway ECU 202. A CAN transceiver 253 receives messages from and transmit messages to other CANs under the control of the CAN controller 252.

Although FIGS. 2 and 2A illustrate one example of a vehicle control system 200, those skilled in the art will recognize that the full structure and operation of a suitable vehicle control system is not depicted in the drawings or described here. Instead, for simplicity and clarity, only the structure and operation necessary for an understanding the present disclosure is depicted and described. Various changes may be made to the example of FIGS. 2 and 2A, and the improved vehicle path prediction and closest in path vehicle detection described in this disclosure may be used with any other suitable vehicle control system.

To support various ADAS functions such as collision avoidance during high performance operation, the IPM CAN 211 for the vehicle 100 can accurately predict the vehicle path, and the radar CAN 220 can detect the closest in path object to determine whether collision is likely. In the present disclosure, a combination of radar and vision (with optional input from other sensors) is used to detect and track target vehicles within the ego vehicle path (where "ego" refers to the vehicle implementing the ADAS and/or AD feature(s)).

Figure 3:
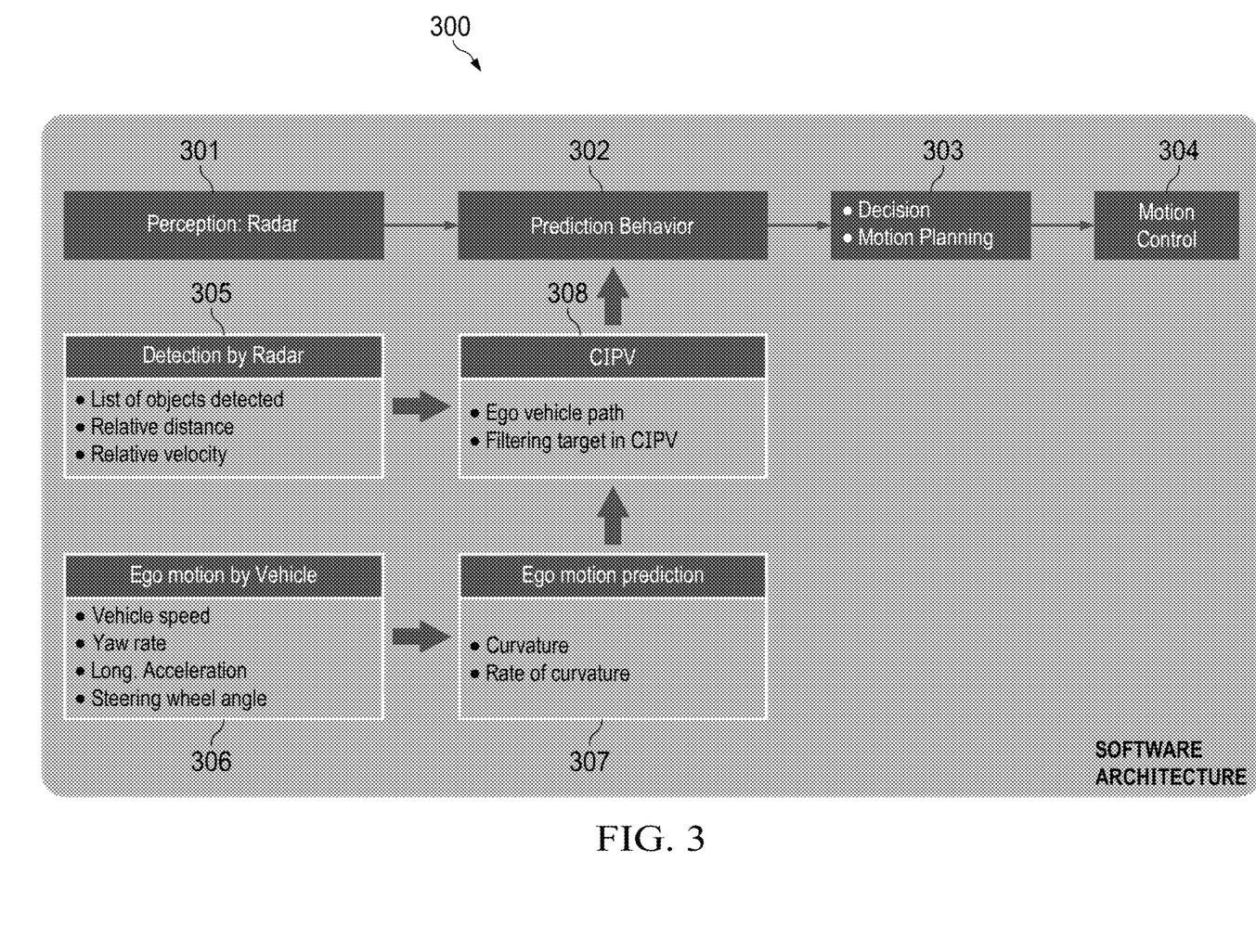
FIG. 3 illustrates a functional diagram of a system within a vehicle for performing improved vehicle path prediction and closest in path vehicle detection in accordance with embodiments of the present disclosure.

FIG. 3 illustrates a functional diagram of a system 300 within a vehicle for performing improved vehicle path prediction and closest in path vehicle detection in accordance with embodiments of the present disclosure. The embodiment of the system 300 illustrated in FIG. 3 is for illustration and explanation only. FIG. 3 does not limit the scope of this disclosure to any particular implementation. In some embodiments, the system 300 in FIG. 3 may be implemented by, or in connection with, the chassis CAN 205 and braking ECU 206 and steering ECU 207 in FIG. 2, including the functional (CAN) ECU 251, CAN processor/controller 252, and CAN transceiver 253 depicted in FIG. 2A for the chassis CAN 205. Lane detection for the system 300 in FIG. 3 may be implemented using, or by connection to, the front camera 106 and the side cameras 107 in FIG. 1 and the IPM CAN 211, front camera ECU 216, side camera ECU(s) 217, and rear camera ECU 218 in FIG. 2, including the functional (CAN) ECU 251, CAN processor/controller 252, and CAN transceiver 253 depicted in FIG. 2A for the IPM CAN 211. Target vehicle detection for the system 300 in FIG. 3 may be implemented using, or by connection to, the radar CAN 220 and radar ECU 221 depicted in FIG. 2, and the radar transceiver, including the functional (CAN) ECU 251, CAN processor/controller 252, and CAN transceiver 253 depicted in FIG. 2A for the radar CAN 220. Specific functions depicted in FIG. 3 may be distributed among those components.

To support ADAS and AD features, the system 300 includes the functions of camera perception and radar 301, ego and target vehicle behavior prediction 302, decision and motion planning 303, and motion control 304. Camera perception and radar 301 detects a traffic lane ahead and the relative position and velocity of other vehicles, while vehicle behavior prediction 302 determines whether the ego vehicle could potentially collide with another vehicle ahead in the ego vehicle's path based on the ego vehicle's speed, the predicted path, and the relative position and velocity of each detected target vehicle. Decision and motion planning 303 and motion control 304 respectively determine and, if necessary, implement reactive responses to the ego vehicle's possible collision with a target vehicle, such as evasive steering and/or emergency braking.

Camera perception and radar 301 performs radar detection 305 to determine a list of surrounding objects, the direction and distance of each object detected from the ego vehicle, and the velocity of each object relative to the ego vehicle. Objects may be identified as a target vehicle based, for example, on the relative velocity of the corresponding object. Camera perception and radar 301 also determines motion by the ego vehicle 306, such as the ego vehicle speed, yaw rate, lateral offset from a reference path, longitudinal acceleration, and steering angle. In some embodiments, these ego vehicle parameters may be determined from vision, radar, other sensors such as an inertial measurement unit (IMU), or some combination thereof.

Based on the ego vehicle motion parameters 306, behavior prediction 302 predicts the ego vehicle's motion 307, such as path curvature of the predicted path and rate of curvature of the predicted path. Using the predicted ego vehicle motion 307 and the object list from radar detection 305, behavior prediction 302 determines a closest in path vehicle 308, which involves using the ego vehicle's predicted path to filter target vehicles and determine which target vehicle is closest along the ego vehicle's predicted path.

Figure 4:
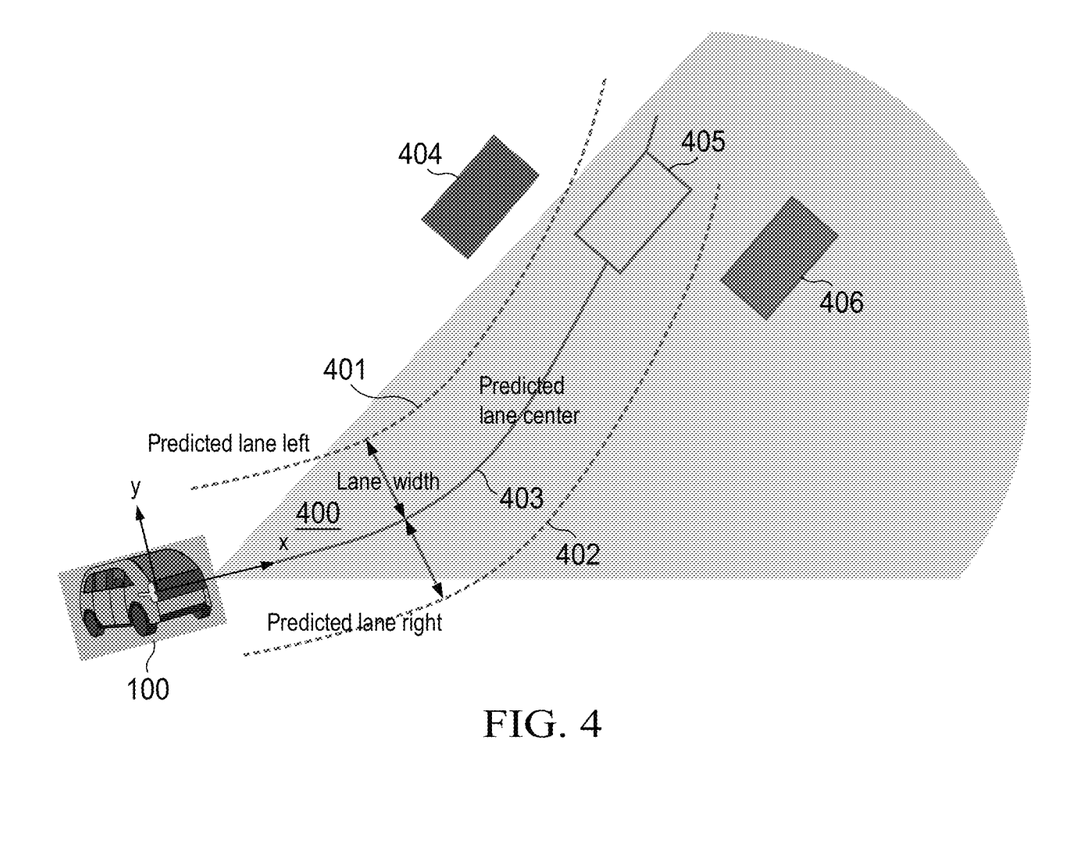
FIG. 4 illustrates a scenario for ego vehicle path prediction and target vehicle detection in accordance with embodiments of the present disclosure.

FIG. 4 illustrates a scenario for ego vehicle path prediction and target vehicle detection in accordance with embodiments of the present disclosure. The ego vehicle 100 occupies and travels within a traffic lane 400 that includes left and right lane boundaries 401, 402 and a predicted lane centerline 403. The predicted lane centerline 403 may serve as a reference path for ego vehicle path prediction. A polynomial representing the path prediction for the ego vehicle 100 can be expressed as:

$$y = a_0 + a_1 x + a_2 x^2 + a_3 x^3,$$

where x is distance along the longitudinal direction of the ego vehicle, y is distance along the lateral direction, $a_0$ is the ego vehicle lateral offset from the reference path, $a_1$ is the ego vehicle heading offset from the reference path, $\frac{1}{2}a_2$ is curvature of the predicted (and reference) path to be found, and $\frac{1}{6}a_3$ is the rate of curvature to be found. When the ego vehicle 100 travels along the reference path (the lane centerline), the above polynomial (with $a_0=0$) represents the predicted lane centerline 403 shown in FIG. 4. The polynomials corresponding to the left and right lane boundaries 401, 402 can be written with the same coefficients ($a_1$, $a_2$, $a_3$) but with lateral offsets ($a_0$) that are half of the lane width, meaning $$a_0 = \pm \frac{1}{2} \cdot \text{Lane width}.$$

Using the path prediction represented by the above polynomial, the closest in path vehicle from among target vehicles 404, 405 and 406 shown in FIG. 4 can be identified as target vehicle 405.

Figure 5:
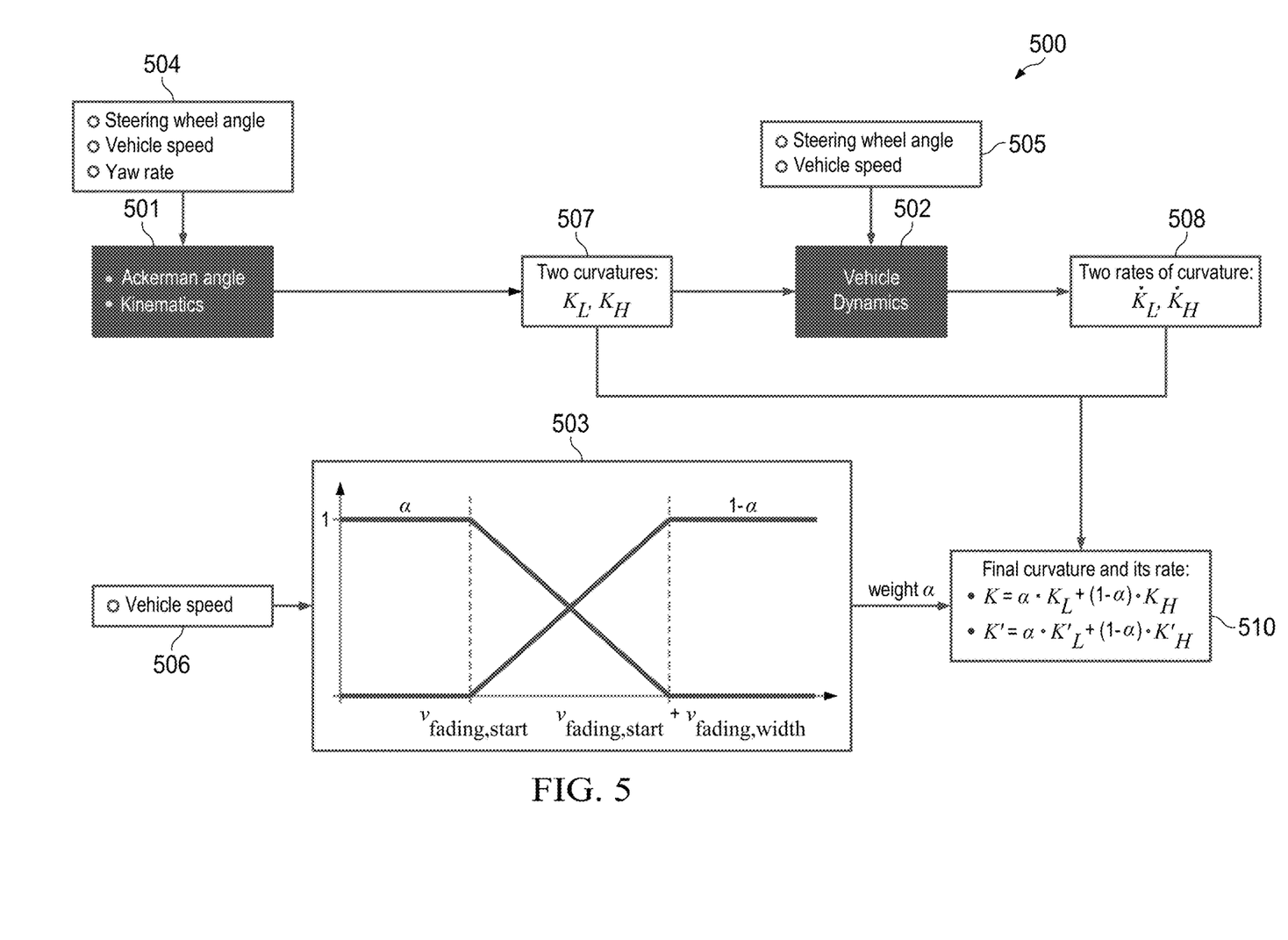
FIGS. 5 and 5A-5B depict processing for a vehicle within which improved vehicle path prediction and closest in path vehicle detection are implemented in accordance with embodiments of the present disclosure.
Figure 5A:
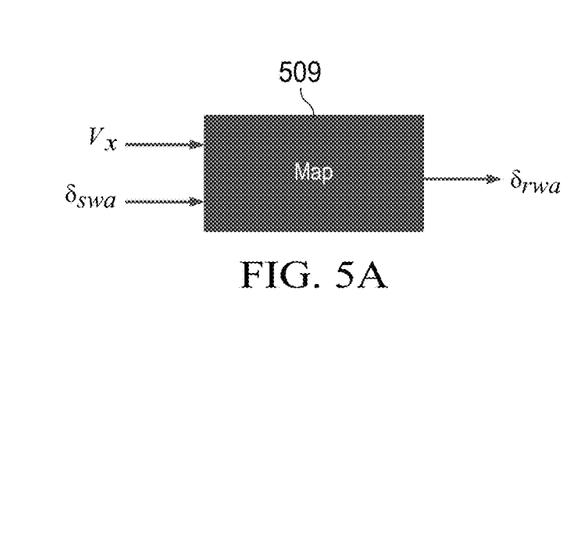
Figure 5B:
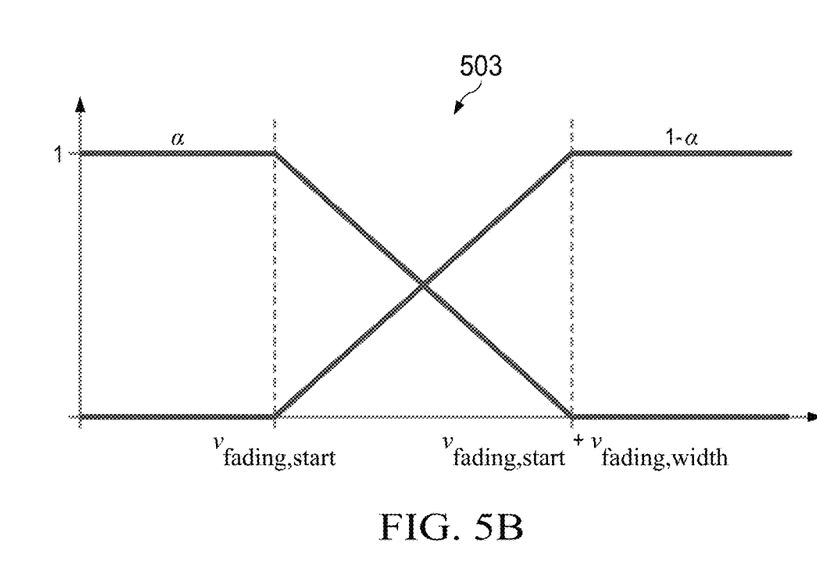

FIGS. 5 and 5A-5B depict processing for a vehicle within which improved vehicle path prediction and closest in path vehicle detection are implemented in accordance with embodiments of the present disclosure. The embodiment of the processing 500 illustrated in FIG. 5 is for illustration and explanation only. FIG. 5 does not limit the scope of this disclosure to any particular implementation.

Vehicle kinematics 501, vehicle dynamics 502, and weighting 503 may be implemented as part of behavior prediction 302 and/or decision and motion planning 303. Vehicle kinematics 501 receive as inputs 504 the ego vehicle steering angle, speed, and yaw rate. Vehicle dynamics 502 receive as inputs 505 the ego vehicle steering angle and speed. Weighting 503 receives as an input 506 the ego vehicle speed.

In some embodiments, the ego vehicle path prediction is made with a third-order polynomial including both curvature and rate of curvature. Two types of curvature and rate of curvature may be obtained by using the Ackerman angle, kinematics, and vehicle dynamics. The final curvature and rate of curvature may be determined by fusing the previous initial two types of curvature and the associated rates based on the vehicle speed.

The path curvature $\kappa_L$ can be expressed from the Ackerman angle as:

$$\kappa_L = \frac{\tan(\delta_{rwa})}{L}.$$

The rate of that path curvature $\kappa'_L$ can be derived as:

$$\frac{d}{dx}(\kappa_L) = \kappa'_L = \frac{d}{dt}(\kappa_L) \cdot \frac{dt}{dx} = \sec^2(\delta_{rwa}) \cdot \frac{\dot{\delta}_{rwa}}{L} \cdot \frac{1}{V_x}$$

where the derivative of road wheel angle $\dot{\delta}_{rwa}$ can be obtained from the first-order delay between road wheel angle ($\delta_{rwa}$) and steering wheel angle ($\delta_{swa}$) by a time delay $\tau$ and a ratio ($k$):

$$\frac{\delta_{rwa}}{\delta_{swa}} = \frac{k}{\tau s + 1},$$

which can be written in the time domain as:

$$\dot{\delta}_{rwa} = \frac{1}{\tau} \delta_{rwa} + \frac{k}{\tau} \delta_{swa}.$$

The path curvature $\kappa_H$ can be also expressed from kinematics using yaw rate $\omega$ and vehicle speed $V_x$:

$$\kappa_H = \frac{\omega}{V_x}.$$

The rate of path curvature $\kappa'_H$ can be derived as:

$$\frac{d}{dx}(\kappa_H) = \kappa'_H = \frac{d}{dt}(\kappa_H) \cdot \frac{dt}{dx} = k_H \cdot \frac{dt}{dx} = \left( \frac{\dot{\omega}}{V_x} - \frac{\omega a_x}{V_x^2} \right) \cdot \frac{1}{V_x},$$

where $\dot{\omega}$ can be obtained from bicycle dynamics. The integrated system model with first-order delay and bicycle dynamics can be expressed as:

$$\begin{Bmatrix} \dot{\beta} \\ \dot{\omega} \\ \dot{\delta}_{rwa} \end{Bmatrix} =$$

$$\begin{bmatrix} \frac{-2}{mV_x}(C_f + C_r) & -1 + \frac{2(-l_f C_f + l_r C_r)}{mV_x^2} & 2\frac{C_f}{mV_x} \\ \frac{2}{I_z}(-l_f C_f + l_r C_r) & \frac{-2}{I_z V_x}(l_f^2 C_f + l_r^2 C_r) & 2\frac{l_f C_f}{I_z} \\ 0 & 0 & -\frac{1}{\tau} \end{bmatrix} \begin{Bmatrix} \beta \\ \omega \\ \delta_{rwa} \end{Bmatrix} + \begin{bmatrix} 0 \\ 0 \\ \frac{k}{\tau} \end{bmatrix} \delta_{swa},$$

where $\beta$ is side slip angle, $\omega$ is yaw rate, $C_f$ and $C_r$ are respectively front/rear cornering stiffness, $l_f$ and $l_r$ are respectively front/rear axle distance from the vehicle center of gravity, m is vehicle mass, and $I_z$ is yaw rotational inertia.

Accordingly, vehicle kinematics 501 output two curvatures 507, $\kappa_L$ and $\kappa_H$. Vehicle dynamics 502 employ those two curvatures to derive two rates of curvature 508, $\dot{\kappa}_L$ and $\dot{\kappa}_H$ (or alternatively $\kappa'_L$ and $\kappa'_H$). The relationship among vehicle speed $I_z$, steering wheel angle $\delta_{swa}$, and road wheel angle $\delta_{rwa}$ may be provided in a mapping table 509 as illustrated in FIG. 5A.

The final curvature used for ego vehicle path prediction can be determined from those calculated from Ackerman angle and kinematics, and the final rate of curvature used for ego vehicle path prediction can be derived from the curvatures calculated from Ackerman angle and kinematics. For example, this may be accomplished by applying weights $\alpha$ and $1-\alpha$ as follows:

$$y = \kappa x^2 + \kappa' x^3$$

$$\kappa = \alpha \cdot \kappa_L + (1-\alpha) \cdot \kappa_H$$

$$\kappa' = \alpha \cdot \kappa'_L + (1-\alpha) \cdot \kappa'_H$$

The weights $\alpha$ and $1-\alpha$ can be applied by weighting 503 based on vehicle speed according to tuning parameters $v_{fading,start}$ and $v_{fading,width}$ as shown in FIG. 5B, where $\alpha$ decreases linearly and 1−α increases linearly between $v_{fading,start}$ and $v_{fading,start}+v_{fading,width}$.

The third-order polynomial above for ego vehicle path prediction can be completed with the following coefficients:

$a_0=0$ $a_1=0$ $a_2=2\kappa$ $a_3=6\kappa'$

Note that $a_0=0$ and $a_1=0$ when the ego vehicle follows the reference path (the predicted lane centerline 403). The left and right lane boundaries 401, 402 have the same coefficients ($a_1$, $a_2$, $a_3$) but different lateral offsets $$a_0 = +\frac{1}{2} \cdot \text{Lane width and } a_0 = -\frac{1}{2} \cdot \text{Lane width.}$$

Figure 6:
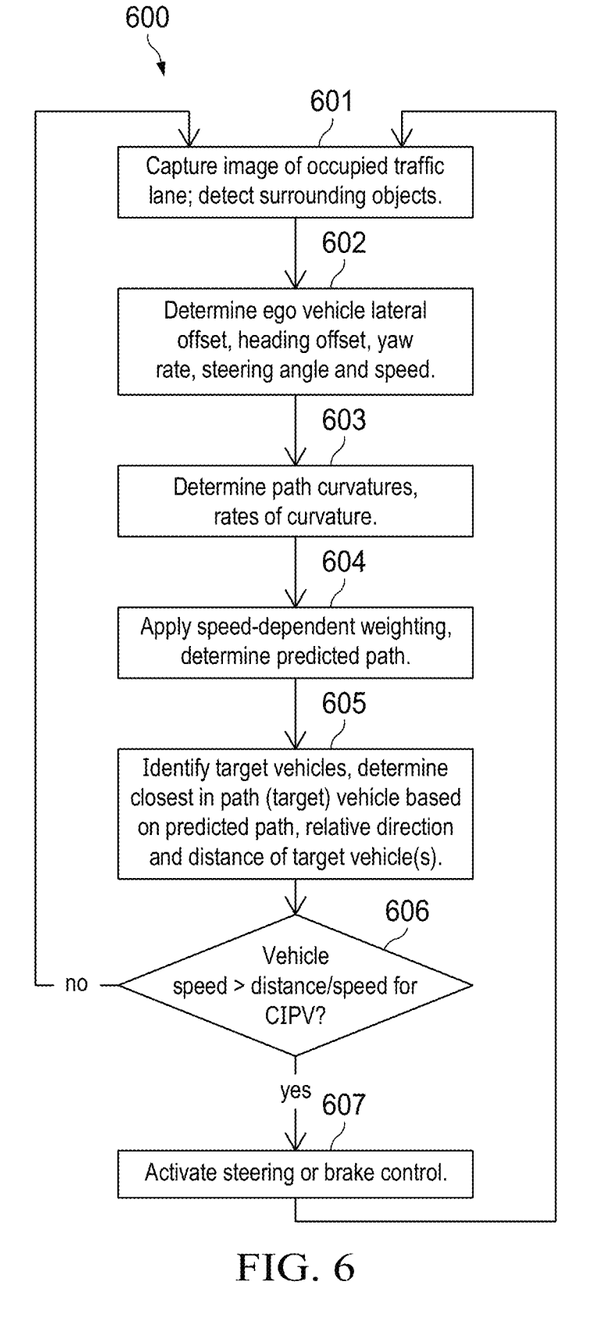
FIG. 6 illustrates a high level flow diagram for a process of improved vehicle path prediction and closest in path vehicle detection in accordance with embodiments of the present disclosure.

FIG. 6 illustrates a high level flow diagram for a process 600 of improved vehicle path prediction and closest in path vehicle detection in accordance with embodiments of the present disclosure. The embodiment of the process 600 illustrated in FIG. 6 is for illustration and explanation only. FIG. 6 does not limit the scope of this disclosure to any particular implementation. In some embodiments, the process 600 in FIG. 6 may be implemented using, or by connection to, the front camera 106 and the side cameras 107 in FIG. 1; the chassis CAN 205, braking ECU 206, and steering ECU 207 in FIG. 2; the IPM CAN 211, front camera ECU 216, side camera ECU 217 in FIG. 2; and the radar CAN 220 and radar ECU 221 in FIG. 2. The process 600 may be implemented using the functions depicted in FIG. 3 and the processing depicted in FIG. 5.

The example process 600 illustrated in FIG. 6 includes capturing at least one image of the traffic lane occupied by the vehicle using at least one camera mounted on the vehicle and detecting objects around the vehicle using the radar transceiver (step 601). The vehicle lateral offset from a reference path for the lane (which may be a lane centerline, one of the lane boundaries, or a different reference path selected based on road conditions), the vehicle heading offset from the path curvature, the vehicle yaw rate, a vehicle steering angle, and the vehicle speed are determined (step 602) using any suitable techniques from the image and/or other sensor data.

A kinematics control (e.g., kinematics 501) is used to determine path curvatures according to kinematics and Ackerman steering angle, and a dynamics control (e.g., dynamics 502) is used to determine rates of the two curvatures (step 603). Vehicle speed-dependent weighting is applied (e.g., by weighting 503) to determine final predicted path curvature and rate of curvature so that the predicted path is determined (step 604). Based on the predicted path and relative direction and distance of each identified target vehicle, a closest in path vehicle is determined (step 605).

Optionally, the process 600 includes a check of whether the vehicle speed (determined, for example, from the input signal for the speedometer within the dashboard ECU 209) exceeds a value determined based on distance to and speed of the closest in path vehicle (step 606). If not, another iteration of the process is started. If so, the process activates a brake control (step 607) or illuminates a warning indicator until the vehicle speed is sufficiently reduced, and another iteration of the process is started.

The determination of two curvatures based on kinematics and Ackerman steering angle, and two rates of curvature, with weighted combinations of both used for path prediction helps to detect and track to the closest in path target object(s) so that prediction, planning, and control may take advantage of that information. In some embodiments, radar and sensor fusion is used so there is little or no increase in cost or difficulty in manufacturability and assembly.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
    a transceiver configured to receive signals from controller area network (CAN) bus from at least one device configured to detect host vehicle motion of a host vehicle; and
    a path prediction and vehicle detection controller configured to:
        determine first path curvature parameters for predicting a path of the host vehicle based on the detected host vehicle motion being within a first range of host vehicle speeds,
        determine second path curvature parameters for predicting the path of the host vehicle based on the detected host vehicle motion being within a second range of host vehicle speeds different than the first range, predict the path of the host vehicle using a combination of the first path curvature parameters and the second path curvature parameters, wherein the combination is weighted based on a speed of the host vehicle,
identify one of one or more target vehicles as a closest in path vehicle based on the predicted path of the host vehicle, and
activate at least one of a braking control or a steering control based on a proximity of the identified closest in path vehicle.

2. The apparatus according to claim 1, wherein:
the first path curvature parameters comprise a first path curvature for predicting the path of the host vehicle and a first rate of change of the first path curvature; and
the second path curvature parameters comprise a second path curvature for predicting the path of the host vehicle and a second rate of change of the second path curvature.

3. The apparatus according to claim 1, wherein the first path curvature parameters are more accurate for the first range of host vehicle speeds than the second path curvature parameters, and the second path curvature parameters are more accurate for the second range of host vehicle speeds than the first path curvature parameters.

4. The apparatus according to claim 1, wherein the weighted combination weights the first path curvature parameters using a weight $\alpha$ and weights the second path curvature parameters using a weight $1-\alpha$.

5. The apparatus according to claim 4, wherein:
the weight $\alpha$ is applied to the first path curvature parameters for vehicle speeds below a first threshold; and
the weight $1-\alpha$ is applied to the second path curvature parameters for vehicle speeds above a second threshold.

6. The apparatus according to claim 5, wherein the weight $\alpha$ and the weight $1-\alpha$ vary linearly with host vehicle speed between the first and second thresholds.

7. The apparatus according to claim 5, wherein:
the first path curvature parameters comprise a first path curvature $\kappa_L$ and a first rate $\kappa'_L$;
the second path curvature parameters comprise a second path curvature $\kappa_H$ and a second rate $\kappa'_H$;
the first path curvature $\kappa_L$ and the second path curvature $\kappa_H$ are combined according to $\kappa = \alpha \cdot \kappa_L + (1-\alpha) \cdot \kappa_H$; and
the first rate $\kappa'_L$ and the second rate $\kappa'_H$ are combined according to $\kappa' = \alpha \cdot \kappa'_L + (1-\alpha) \cdot \kappa'_H$.

8. The apparatus according to claim 1, wherein the path prediction and vehicle detection controller is configured to generate at least one of a braking command and a steering command based on the speed of the host vehicle and a proximity of the identified closest in path vehicle.

9. The host vehicle comprising the apparatus according to claim 1, the host vehicle further comprising:
a motor configured to drive wheels of the host vehicle;
a chassis supporting axles on which the wheels are mounted, the steering control configured to generate a steering command configured to control the wheels when the steering control is activated based on the proximity of the identified closest in path vehicle; and
a brake actuator configured to actuate brakes for one or more of the wheels, the brake actuator configured to receive a braking control signal from the braking control when the braking control is activated based on the proximity of the identified closest in path vehicle.

10. The host vehicle according to claim 9, wherein the host vehicle is an electric vehicle and the motor is an electric motor.

11. A method, comprising:
receiving signals from controller area network (CAN) bus from at least one device configured to detect host vehicle motion of a host vehicle;
determining first path curvature parameters for predicting a path of the host vehicle based on the detected host vehicle motion being within a first range of host vehicle speeds;
determining second path curvature parameters for predicting the path of the host vehicle based on the detected host vehicle motion being within a second range of host vehicle speeds different than the first range;
predicting the path of the host vehicle using a combination of the first path curvature parameters and the second path curvature parameters, wherein the combination is weighted based on a speed of the host vehicle;
identifying one of one or more target vehicles as a closest in path vehicle based on the predicted path of the host vehicle; and
activating at least one of a braking control or a steering control based on a proximity of the identified closest in path vehicle.

12. The method according to claim 11, wherein:
the first path curvature parameters comprise a first path curvature for predicting the path of the host vehicle and a first rate of change of the first path curvature; and
the second path curvature parameters comprise a second path curvature for predicting the path of the host vehicle and a second rate of change of the second path curvature.

13. The method according to claim 11, wherein the first path curvature parameters are more accurate for the first range of host vehicle speeds than the second path curvature parameters, and the second path curvature parameters are more accurate for the second range of host vehicle speeds than the first path curvature parameters.

14. The method according to claim 11, wherein the weighted combination weights the first path curvature parameters using a weight $\alpha$ and weights the second path curvature parameters using a weight $1-\alpha$.

15. The method according to claim 14, wherein:
the weight $\alpha$ is applied to the first path curvature parameters for vehicle speeds below a first threshold; and
the weight $1-\alpha$ is applied to the second path curvature parameters for vehicle speeds above a second threshold.

16. The method according to claim 15, wherein the weight $\alpha$ and the weight $1-\alpha$ vary linearly with host vehicle speed between the first and second thresholds.

17. The method according to claim 15, wherein:
the first path curvature parameters comprise a first path curvature $\kappa_L$ and a first rate $\kappa'_L$;
the second path curvature parameters comprise a second path curvature $\kappa_H$ and a second rate $\kappa'_H$;
the first path curvature $\kappa_L$ and the second path curvature $\kappa_H$ are combined according to $\kappa = \alpha \cdot \kappa_L + (1-\alpha) \cdot \kappa_H$; and
the first rate $\kappa'_L$ and the second rate $\kappa'_H$ are combined according to $\kappa' = \alpha \cdot \kappa'_L + (1-\alpha) \cdot \kappa'_H$.

18. The method according to claim 11, further comprising:
generating at least one of a braking command and a steering command based on the speed of the host vehicle and a proximity of the identified closest in path vehicle.

19. The method according to claim 11, further comprising:
   driving wheels of the host vehicle with a motor;
   supporting axles on which the wheels are mounted with a chassis, the steering control configured to generate a steering command configured to control the wheels when the steering control is activated based on the proximity of the identified closest in path vehicle; and
   actuating brakes for one or more of the wheels when the braking control is activated based on the proximity of the identified closest in path vehicle.

20. A host vehicle configured to operate according to the method of claim 19, wherein the host vehicle is an electric vehicle and the motor is an electric motor.

* * * * *